March 29, 1955

O. J. EISELE 2,704,923

ROTARY PUMP AND MOTOR HYDRAULIC TRANSMISSION

Filed Nov. 10, 1950

Otto J. Eisele.
*INVENTOR.*

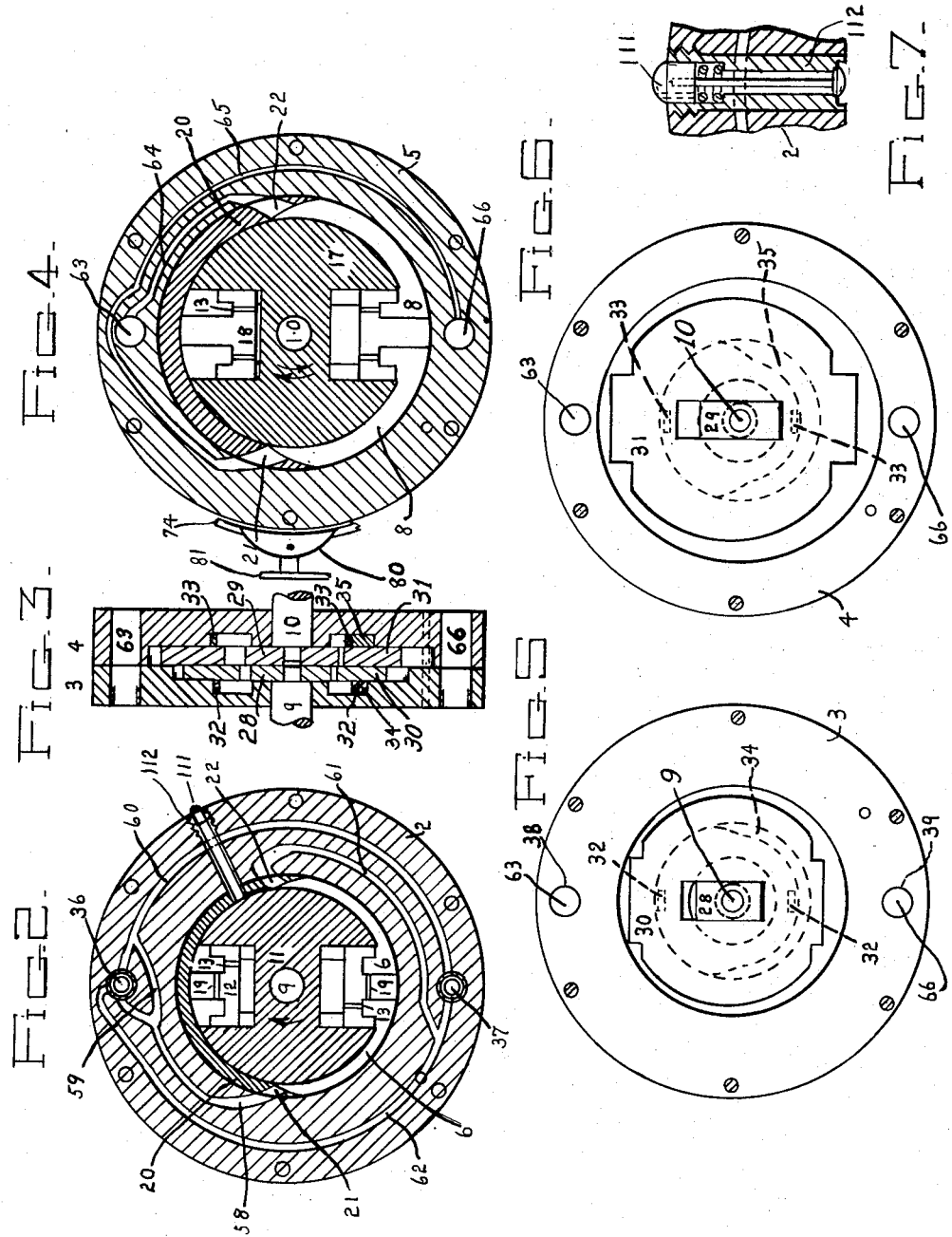

INVENTOR.

March 29, 1955  O. J. EISELE  2,704,923
ROTARY PUMP AND MOTOR HYDRAULIC TRANSMISSION
Filed Nov. 10, 1950  5 Sheets-Sheet 4
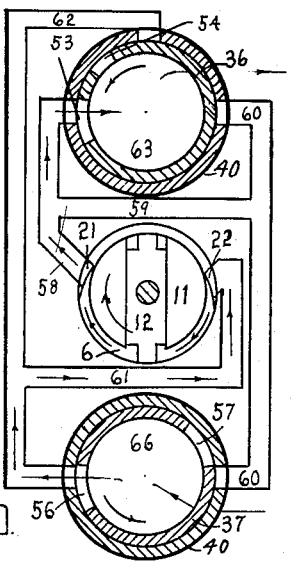
Fig.10.
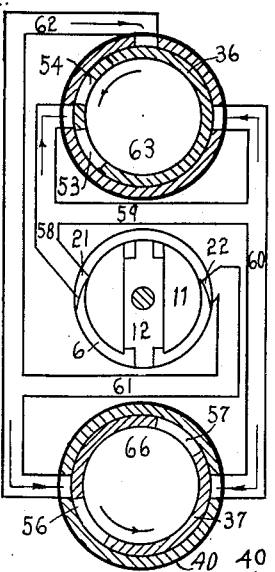
Fig.11.
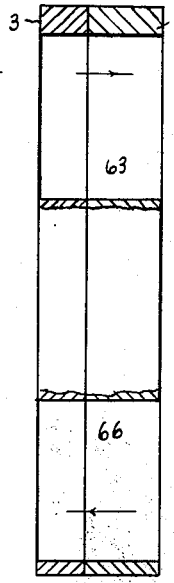
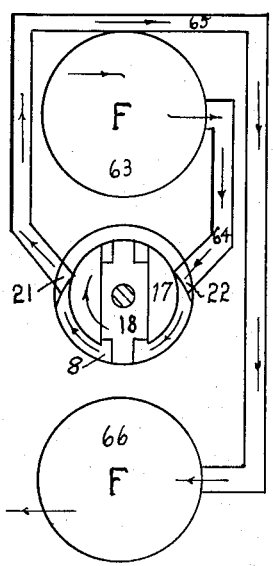
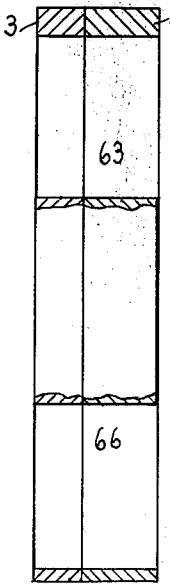
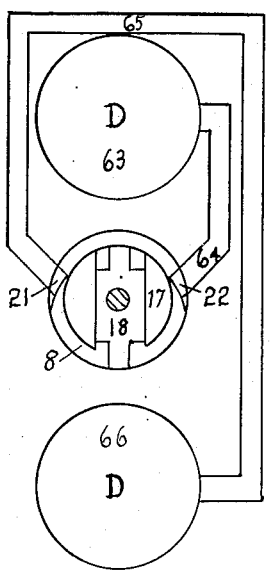
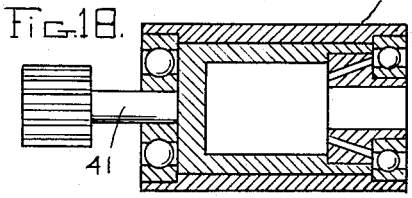
Fig.18.
Otto J. Eisele
INVENTOR.

March 29, 1955 O. J. EISELE 2,704,923
ROTARY PUMP AND MOTOR HYDRAULIC TRANSMISSION
Filed Nov. 10, 1950 5 Sheets-Sheet 5
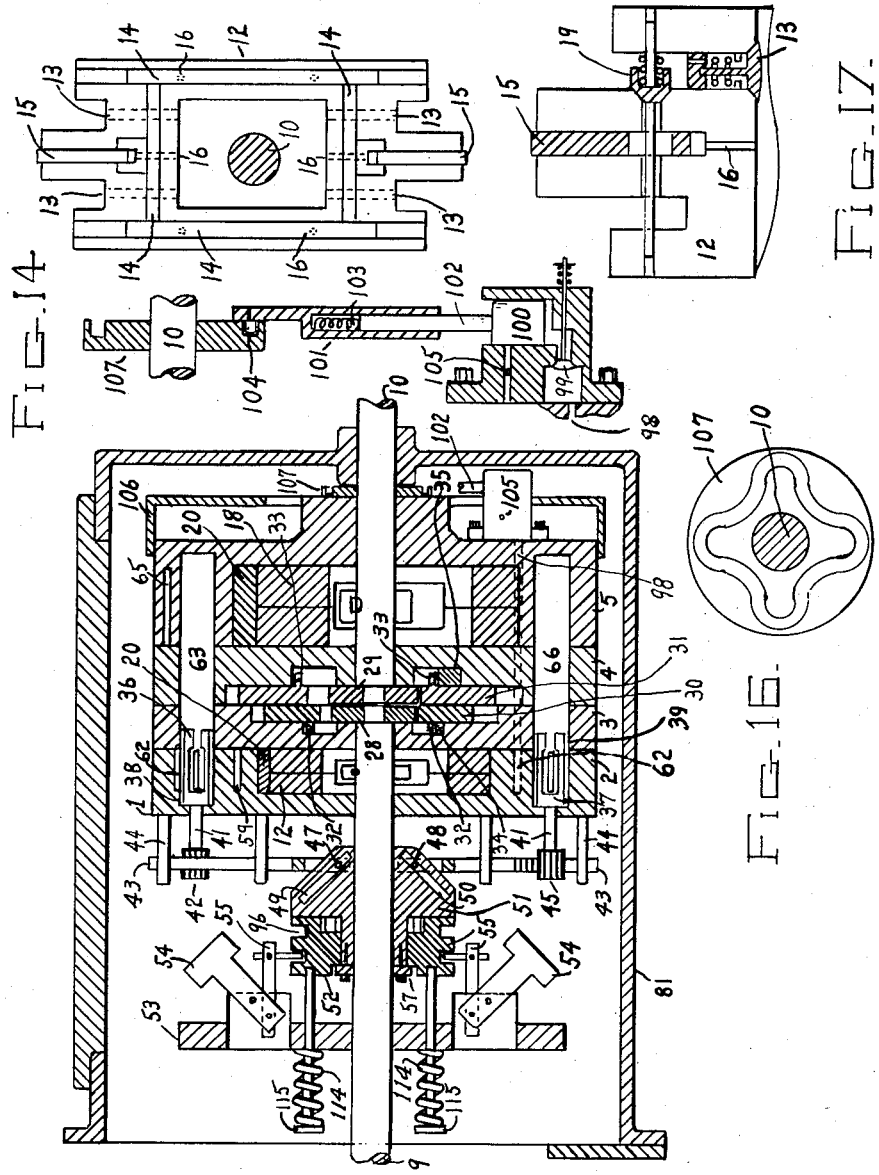
Otto J. Eisele
INVENTOR.

United States Patent Office 2,704,923
Patented Mar. 29, 1955

2,704,923

ROTARY PUMP AND MOTOR HYDRAULIC TRANSMISSION

Otto J. Eisele, Bronx, N. Y.

Application November 10, 1950, Serial No. 194,997

11 Claims. (Cl. 60—53)

The invention herein disclosed relates to hydraulic transmissions of the type covered in Patent No. 2,418,292 of April 1, 1947, Patent No. 2,574,819 of November 13, 1951, and Patent No. 2,598,896 of June 3, 1952.

The general objects of the invention are to provide a more simple unitary form of transmission mechanism between the power source and driven parts than in the patents identified, affording forward and reverse drive, automatically controllable to effect progressive forward speed as power is applied, idling, and optional reverse drive, together with a positive form of coupling in advanced stages of forward drive and means to effect overrun in forward and reverse drive after prime mover deceleration or by load momentum, or both.

The casing of this invention houses a balanced pump and motor unit as compared to twin pump and motor units as disclosed in Patents Nos. 2,574,819 and 2,598,896, the pump and motor elements of this invention being respectively similar to one of said twin units with the exception that the reciprocating piston or vane of the motor element of this invention carries no overrun effecting valves.

As disclosed in Patents Nos. 2,574,819 and 2,598,896, there is a casing which has two rotatable, tubular adjustable ported valves positioned therein to cooperatively regulate the flow of oil within two separate two-way endless oil circuits, while in the casing of this invention two similar valves cooperatively divert the oil within a single oil system to effect the same results in accordance with adjustment of said valves.

Other improvements simplify the operating mechanism and force pumps replenish air or oil ejected instead of relying upon suction intake, as disclosed in the patents identified.

The invention simplifies construction, affords easier assembly, saves fuel, affords a more compact design, considerably reduces the cost of manufacture and increases efficiency on account of overrun.

While effecting speeds up to direct drive the casing will slow or speed up in accordance with resistance offered, thereby converting torque and effecting smooth operation free of jerks or shock and overrun to effect smooth diminishing speed after prime mover deceleration.

Other desirable improvements will appear in the course of the following specification.

The drawings accompanying and forming part of the specification illustrate a practical commercial embodiment of the invention. Structure, however, may be modified and changed, all within the true intent and broad scope of the invention as hereinafter defined and claimed.

Fig. 1 in the drawings is a partial longitudinal sectional and side elevational view of one of the new transmission units;

Figs. 2, 3 and 4 are sectional views of the drive pump and motor elements, Fig. 2 being a transverse sectional view of the machine as on substantially the plane of line 2—2 of Fig. 1; Fig. 3 being a vertical cross section of the double disks 3 and 4, each disk formed to contain a balancing element and said disks partly forming separate pump and motor chambers; Fig. 4 being a transverse sectional view as on substantially the plane of line 4—4 of Fig. 1;

Figs. 5 and 6 are face views of the balancing elements as on substantially the plane of line 5—6 of Fig. 1;

Fig. 7 is a broken sectional detail of the relief valve leading from outside the casing to the inner arc of the cam element secured in the pump chamber;

Figs. 8, 9, 10 and 11 are broken sectional and diagrammatic views of parts shown in Figs. 2, 3 and 4 and illustrating the fluid circuits for reverse (R), neutral (N), first (F) and direct (D) drives;

Fig. 13 is a substantially central broken longitudinal sectional view of the mechanism shown in Fig. 1;

Fig. 14 is a central longitudinal sectional view of an oil-pump and cam element to actuate said pump;

Fig. 15 is a face view of the transversely reciprocating vane structure of one of the rotors;

Fig. 16 is a face view of the cam element that actuates an oil pump;

Fig. 17 is a partial inner face view of the reciprocating vane of the pump rotor showing a central longitudinal section of one of the overrun effecting valves;

Fig. 18 is a longitudinal sectional view of one of the ported, rotatively adjustable, tubular oil flow regulating valves, mainly to show construction—no port being shown.

Figure 1:
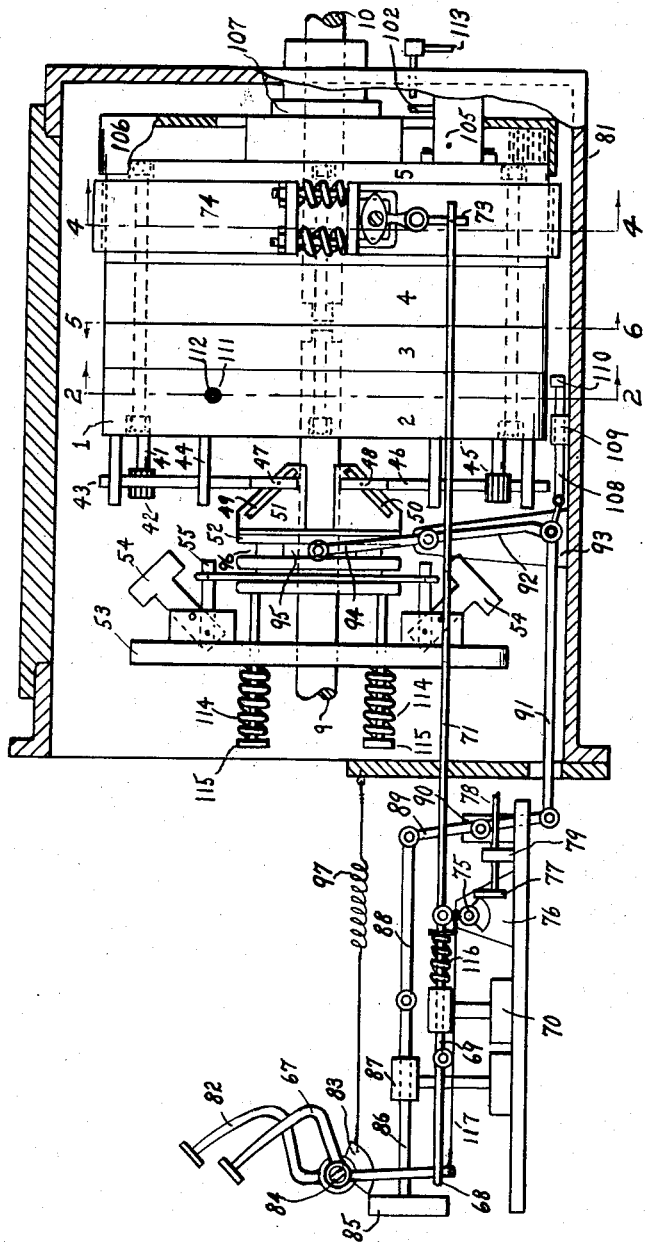

The present invention is based largely on the form of the mechanical clutch disclosed in Patent No. 2,418,292, on the form of automatic variable speed and reverse hydraulic transmission disclosed in Patent No. 2,574,819 and on the form of the fully balanced combination overdrive and hydraulic transmission disclosed in Patent No. 2,598,896, and involving pump and motor units within a casing 1 rotatably mounted on the adjoining ends of coaxial input shaft 9 and output shaft 10 respectively, as shown in Figs. 1 and 13.

The rotary casing 1 is shown in Figs. 1 and 13 made up of adjoining disk-like sections 2, 3, 4 and 5, bolted or otherwise secured together.

Sections 2 and 3 form a cylindrical drive pump chamber 6, as shown in Figs. 2 and 13. Sections 4 and 5 form a cylindrical motor chamber 8, as shown in Figs. 4 and 13. Sections 3 and 4 form an intermediate cylindrical chamber, each section having an annular groove, as best shown in Fig. 3.

The pump unit consists of the pump chamber 6 having a cam element 20, as shown in Fig. 2, with arcuate end portions feathered down to the general periphery of the chamber, the sides of said portions being notched to form ports 21 and 22, a pump rotor 11 comprising two segments spaced by a reduced bridge portion keyed to the input shaft 9 and having between them a transversely guided sliding vane 12, the ends of said vane to slidably contact and coact with the periphery of chamber 6 to reciprocally actuate said vane, and the sides of said vane to slidably contact the enclosing walls of chamber 6, said vane carrying overrun effecting valves 19, as shown in Fig. 17, in its outer end portions, as fully disclosed in the patents identified. A rectangular block 28 is keyed to the reduced end of shaft 9, parallel to vane 12. A cam element 34 is positioned and secured in the annular groove of section 3, Fig. 3, correspondingly opposite to cam element 20 in chamber 6. A plate 30 having a rectangular slot is slidably fitted on block 28 and has projecting studs 32 to slidably contact the periphery formed by said groove and cam 34 to reciprocally actuate said plate as means to reciprocally balance the reciprocating vane 12.

As shown in Figs. 2 to 6, the construction of the pump and motor units are the same except that the elements of the motor unit (Figs. 4 and 6) are larger to effect a suitable hydraulic ratio, said motor unit consisting of the chamber 8, ported cam element 20 having ports 21 and 22, motor rotor 17 keyed to the output shaft 10, transversely guided sliding vane 18, rectangular block 29 keyed to the reduced end of shaft 10 parallel to vane 18, a cam element 35 positioned and secured in the annular groove of section 4, Fig. 3, correspondingly opposite to cam element in chamber 8, plate 31 having a rectangular slot slidably fitted on block 29 and having projecting studs 33 to slidably contact the periphery formed by said groove and cam element 35 to reciprocally actuate said plate as means to reciprocally balance the reciprocating vane 18, with the exception that vane 18 carries no overrun effecting valves.

The pump unit revolves in a clockwise direction and hydraulic means between said unit and motor unit revolves the motor unit for either variable forward drive, idling and variable reverse drive, in accordance with rotatable adjustment of the ported tubular valves 36 and 37 in bushings 40 fixed in oil passages 63 and 66, said bushings being ported to register with oil passages, as shown in Figs. 8, 9, 10 and 11. The casing 1 is stopped gradually to cooperatively attain said reverse drive only.

Fig. 18 shows one of the valves 36 and 37, riding on ball-bearings in bushing 40, each valve having a shaft 41 projecting from the casing 1, as shown in Fig. 13, the shaft 41 of valve 36 carrying pinion 42 and the shaft 41 of valve 37 carrying pinion 45.

Casing 1 has abutting rack guides 44 projecting therefrom for guided racks 43 which carry rolls 47 and 48 riding in inclined slots 49 and 50 in a transverse plate 51 rotatably mounted on input shaft 9 and shiftable longitudinally thereon by clutch collar or sleeve 52, as fully disclosed in Patent No. 2,598,896.

The collar 52 and plate 51 revolve independently of each other with a ball-bearing interposed. A ring 57 screwed to the circular portion of plate 51 slidably holds plate 51 and collar 52 together, said collar having spring supports 115 projecting therefrom and through fly-wheel 53 and carrying retracting springs 114, as disclosed in Patent No. 2,598,896.

In Fig. 1 an arm 94 of rocker-fork 92 is pivotally connected to a yoke 95 slidably fitted in the annular groove 96 of collar 52, link 91, rocker 89 on standard 90, and link 88 pivotally connecting fork 92 with the projection 86 of block 85 in slideway 87. A foot pedal 82 of the rocker type is mounted on shaft 84, its opposite arm formed as a cam 83, the radial side of which engages block 85 to force valves 36 and 37 back towards their reverse positions in cooperation with retracting springs 114 against the centrifugal force of weights 54 to effect reduced speeds or idling of the power source, after which the radial arc of said cam slides over the corner of block 85 to prevent centrifugal force from interfering with reverse drive. A spring 97 is provided to retract pedal 82.

The speed of an auto will thus be determined by alternately releasing and applying foot pressure against the prime mover accelerator of an auto and the regular brake pedal of an auto with one foot only, overrun to effect smooth reduced speeds after prime mover deceleration.

Also shown in Fig. 1, a foot pedal 67 of the rocker type is provided for reverse speed, mounted on shaft 84, link 68, line 69 in slideway 70 and link 71, pivotally connecting the arm of pedal 67 with the brake band locking mechanism 73 and link 69 carrying a retracting spring 116. A cam 75 is mounted on the standard 76 and a wire 117 is connected with the arm of said cam and with the arm of pedal 67, the side of cam 75 to actuate the block 77 having a projecting rod fitted in slideway 79. Rod 78 is shown to adjust a carburetor for limited fuel supply after which the arc of cam 75 slides over the edge of block 77 as means to prevent stalling of the power source and permitting continued application of brake band 74 to attain variable reverse speed in accordance with foot pressure applied to pedal 67 to slow and stop the casing 1 from revolving.

To effect reverse speed the pedal 82 is pushed down after releasing pressure from the gas accelerator so the arc of cam 83 prevents centrifugal force of the weights 54 from interfering with reverse drive, one foot to control the pedal 82 and the other to control pedal 67.

Fig. 4 shows the brake band 74 supported in the housing 81 by laps 80 in position to grip the casing 1.

In Figs. 2, 3, 4 and 13, the system of oil passages and ports from the drive pump chamber to and from the drive motor chamber consists of converging ports and passages, the ports of the tubular valves 36 and 37 positioned within said system to divert oil under pressure to effect reverse drive, idling and forward drive. Said system consists of pump chamber 6, port 21, passage 58 in section 2, longitudinal extending passage and valve chamber 63 containing the tubular valve 36, as best shown in Fig. 13, passage 64, port 22, motor chamber 8, port 21, passage 65 in section 5, longitudinally extending passage 66 and valve chamber containing the tubular valve 37, as best shown in Fig. 13, passage 61 converging with passage 62 and registering with port 22 in section 2 back to chamber 6 in section 2, passage 62 from longitudinally extending passage and valve chamber 66 to longitudinally extending passage and valve chamber 63 in section 2.

Figure 8:
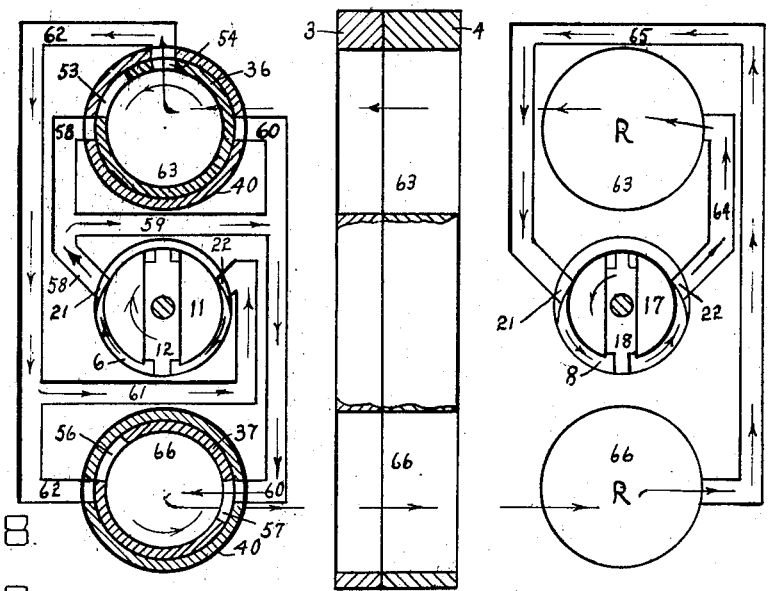

Fig. 8 is a diagrammatic view depicting parts shown in Figs. 2, 3 and 4, and illustrating the oil circuit as controlled by valves 36 and 37 to effect reverse drive. Arrows indicate direction of oil flow under pressure. The reciprocating vane 12 is revolved in a clockwise direction, oil is forced from pump chamber 6 through port 21, passages 58, 59 and 60, through port 57 of valve 37, through passage 65, port 21 into motor chamber 8, revolving rotor 17 and vane 18 in a reverse direction, oil is forced back in passages 64, 63 and 62, port 54 of valve 36, passages 62 and 61, port 22 into chamber 6. In this instance the casing will revolve until it is gradually stopped, as already described, to effect variable reverse speed.

Figure 9:
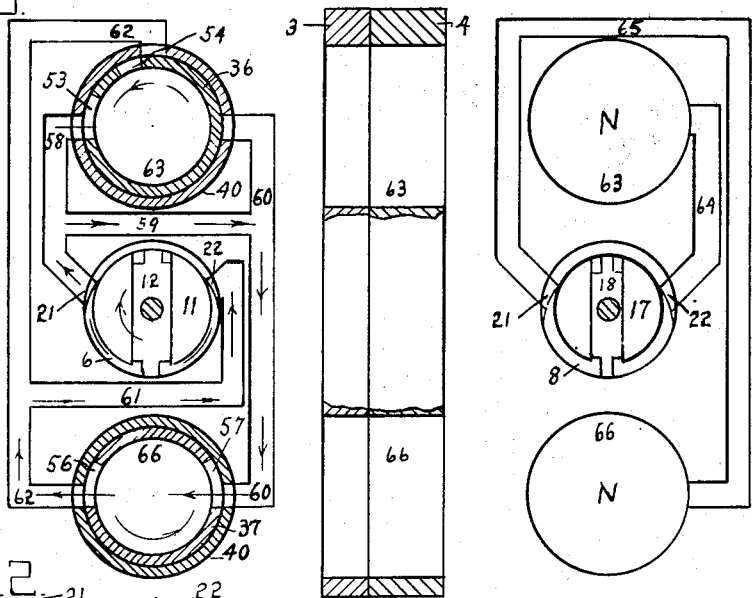
Figure 12:
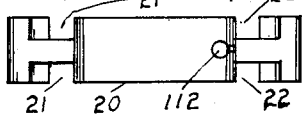
Fig. 12 is a plan view of one of the arcuate pieces having ported tapered end sections or cams.

Similarly, Fig. 9 shows the positions of the ports of valves 36 and 37 for idling of the power source from chamber 6 through port 21, through passages 59 and 60, through ports 57 and 56 of valve 37, passages 62 and 61, through port 22 back into chamber 6.

As the ports of valves 36 and 37 are turned from neutral positions on to first speed positions, a gradual starting speed will be attained as port 57 of valve 37 closes. Fuel is accelerated as valves 36 and 37 are turned progressively forward from their reverse positions before starting to enable sufficient power to prevent stalling of the power source.

Similarly, Fig. 10 shows the positions of the ports of valves 36 and 37 for first speed, from chamber 6 through port 21, passage 58, through port 53 of valve 36, through passages 63 and 64, port 22 into chamber 8, from chamber 8 through port 21, passages 65 and 66, port 56 of valve 37, part of passage 62, passage 61 and port 22 back into chamber 6.

As valves 36 and 37 are turned from first speed positions on to direct drive positions their ports 53 and 56 will gradually close, thereby effecting second speed.

Similarly, Fig. 11 shows all ports of valves 36 and 37 as closed, thereby blocking oil passages 58, 62 and 60 to effect direct drive, shafts 9 and 10 to operate as a single unit.

The stationary housing 81 for the casing 1 is shown as constructed to form an oil container having a pump 113 to pump oil into the container 106 on the far side of the casing 1. A check valve 112, Figs. 1, 2 and 7, is provided having an exposed push-button 111 for momentarily enabling escape of trapped air, said valve to open as the abutment 110 on the sliding rod 108, Fig. 1, connected by link with the arm of clutch fork 92, momentarily contacts the push-button 111. Also, this valve 111 may act as a relief valve in case of excessive heat being generated, for instance, in driving up a steep incline for a considerable distance in lower speed than direct drive, all as disclosed in Patent No. 2,598,896, any air or oil ejected being replaced by force pumps as shown in Figs. 13 and 14, and positioned and secured in balanced relation to each other on the far side of the casing 1 within the oil container 106, one pump to inject oil into passage 62 and the other into passage 60, both pumps reciprocally actuated by the cam element 107, as shown in Fig. 16.

Oil passages 60 and 61 alternately exhaust oil back into chamber 6, as forward drive or overrun up to direct drive are alternately effected, thereby allowing easy oil injection, after oil ejection through valve 112, especially as the foot-brake pedal 82 is employed to force the mechanism into second or low speed position of the control valves 36 and 37 to effect braking action.

One of the force pumps as shown in Fig. 14, consists of a cylinder block adapted to receive the piston 100 and check valve 99, a shoe 101 slidably engaging the piston rod 102 and carrying a roll 104 positioned in the grooved cam element 107 keyed to output shaft 10, said cam to reciprocally actuate piston 100, a spring 103 secured to shoe 101 and rod 102, and an oil hole 105 drilled in said block perpendicular to a hole leading to within the piston cylinder, the valve chamber in this instance to register with the oil hole 98 leading thereto from oil passage 62 in section 2. Oil is received from the oil container 106 through hole 105 into the piston cylinder, from where it is forced into the valve chamber and oil circuit and held in check by check valve 99, spring 103 to prevent blockage when oil circuit is full.

All movable parts within and carried by the fully balanced casing 1 are positioned to operate in balanced relation to each other as means to prevent vibration and wear.

To afford a desirable gear reduction the pump unit indicated in Fig. 13 may be of smaller displacement than the motor unit, for example, in a three or four-to-one ratio.

By reducing power input the clutch collar may shift to effect a lower speed drive relation before direct speed, thus to utilize the braking power of the engine.

While particularly for automobile drive, the invention has special advantages for many other purposes, such as for powering ships, trains or the like.

Operation

The pedal 82 is used to retract and hold the valves 36 and 37 in any valve positions up to direct drive, against the centrifugal force of the governors 54, as means to allow prime mover acceleration under any reduced speed, or to effect hydraulic reduction.

The pedal 67 is used to independently effect limited prime mover acceleration, before actuating the braking mechanism 74 to gradually stop the casing against rotation.

The following are positioned from left to right: first-pedal 82, second-pedal 67, third-regular brakes to stop an auto, fourth-prime mover accelerator.

For starting: Push pedal 82 down to its limit and hold; start the prime mover; then accelerate the prime mover to heat same.

For forward drive: Alternately apply pressure against the prime mover accelerator and the regular brakes.

For reverse drive: Push pedal 82 down to its limit and hold, and while doing so gradually push down on pedal 67.

To start up a hill regardless of load: Push pedal 82 down to its limit, then accelerate the prime mover and gradually release pressure against pedal 82.

When driving up a steep hill and found necessary to drive in a lower speed: Push down pedal 82 for a lower speed, after which accelerate the prime mover.

When driving down a hill at a high rate of speed: First, apply the regular brakes to reduce speed, then apply pedal 82 for a lower speed than direct drive, thereby utilizing the braking power of the engine.

To alternately effect reverse and forward drive: First push pedal 82 down to its limit, then apply pedal 67 for reverse drive, and after fully releasing pressure against pedals 67 and 82, accelerate the prime mover for forward drive. The regular brakes may be used to stop each drive if so desired.

Applying the regular brakes after prime mover deceleration, reduces the centrifugal force to allow easy operation of pedal 82.

Having thus described my invention, what I claim as new and desire to secure by Letters Patent of the United States is:

1. A fluid transmission comprising: coaxial input and output shafts, a casing concentrically rotatable about said shafts and formed with a pump chamber, a motor chamber and an intermediate chamber; a pump unit including a vane carrying rotor within said pump chamber and forming a fluid work chamber therewith, a balancing rotor within said intermediate chamber, each of said rotors of the pump unit being attached to said input shaft for rotation therewith; a motor unit including a vane carrying rotor within said motor chamber and forming a fluid work chamber therewith, a second balancing rotor within said intermediate chamber, each of said rotors of the motor unit being attached to said output shaft for rotation therewith; a three-way fluid passage system within said casing including a supply passage leading from the pump outlet to the motor inlet, a return passage leading from the motor outlet to the pump inlet and a pump by-pass passage leading from the pump outlet to the pump inlet; said vane carrying rotor of the pump having a reciprocating vane with overrunning effecting valves therein.

2. Fluid transmission according to claim 1, in which the pump and motor chambers each have a ported cam element therein for reciprocating the vanes in said vane carrying rotors, the intermediate chamber having two cam elements therein for reciprocating said balancing rotors and the ports of said ported cam elements registering with the inlets and outlets to and from said pump and motor chambers.

3. Fluid transmission according to claim 1, in which the pump unit effecting forward or reverse drive of the motor unit is smaller than the motor unit, introducing hydraulic reduction ratio between said pump and motor unit.

4. Fluid transmission according to claim 1 comprising further, twin centrifugal governors connected to the input shaft and rotatable tubular ported valves actuated thereby and one journaled within said supply passage and the second within said return passage, with ports arranged for registering with said passages.

5. Fluid transmission according to claim 1, including rotatable tubular ported valves, alternately adjustable to control said supply and return passages.

6. Fluid transmission according to claim 1, including rotatable tubular ported valves adjustable to control said supply and return passages, means for holding said valves stationary in positions for reverse drive and controllable means to gradually stop said casing against rotation for effecting reverse drive without stalling the power source.

7. Fluid transmission according to claim 1, including rotatable tubular ported valves controlling said supply and return passages and alternately adjustable for reverse and forward drive and means for turning said valves from reverse and neutral positions to starting position preliminary to forward drive position.

8. Fluid transmission according to claim 1, including rotatable tubular ported valves journaled in said casing within said three-way fluid passage system, means for effecting automatic adjustment of said valves according to speed of said input shaft and means for arbitrarily overcoming said automatic control to effect arbitrary adjustment of said valves.

9. Fluid transmission according to claim 1, including a flywheel connected with said input shaft, centrifugal governor mechanism actuated by said flywheel and means controlled by said centrifugal governor mechanism for effecting control of said three-way fluid passage system.

10. Fluid transmission according to claim 1, including a relief valve in said fluid passage system to permit escape of trapped air or heated fluid from the casing, controllable means for intermittently actuating said valve, a fluid container extending from the side of said casing, pump means attached to said casing within said container, a cam element connected to the output shaft for actuating said pump means to supply fluid from the container to said fluid system, means to prevent blockage of said pump means when the system is full and means for supplying fluid to said container.

11. Fluid transmission according to claim 1, including controllable means to release trapped air or fluid from said fluid passage system, automatic pumping means for supplying fluid to said system and means for preventing blockage of said pumping means when said system is full.

References Cited in the file of this patent

UNITED STATES PATENTS

| Number | Name | Date |
|---|---|---|
| 1,111,994 | Ciarlo | Sept. 29, 1914 |
| 1,203,745 | Kilgore | Nov. 7, 1916 |
| 1,545,678 | Miller | July 14, 1925 |
| 1,816,735 | Magness et al. | July 28, 1931 |
| 2,323,926 | McGill | July 13, 1943 |
| 2,443,074 | Kraft | June 8, 1948 |